(12) United States Patent
Ozaki et al.

(10) Patent No.: US 7,563,188 B2
(45) Date of Patent: *Jul. 21, 2009

(54) CONVEYOR CHAIN

(75) Inventors: Hajime Ozaki, Osaka (JP); Katsutoshi Shibayama, Osaka (JP); Yoshihiro Murakami, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 478 days.

This patent is subject to a terminal disclaimer.

(21) Appl. No.: 11/374,765

(22) Filed: Mar. 14, 2006

(65) Prior Publication Data

US 2006/0237291 A1     Oct. 26, 2006

(30) Foreign Application Priority Data

Apr. 22, 2005   (JP) .............................. 2005-125614

(51) Int. Cl.
*B65G 17/00* (2006.01)
*F16G 13/02* (2006.01)

(52) U.S. Cl. .................. 474/206; 198/779; 198/853

(58) Field of Classification Search ............ 474/206; 198/853, 779
See application file for complete search history.

(56) References Cited

U.S. PATENT DOCUMENTS

| | | | | |
|---|---|---|---|---|
| 6,209,714 B1 * | 4/2001 | Lapeyre et al. | ............. | 198/779 |
| 6,367,616 B1 * | 4/2002 | Lapeyre et al. | ............. | 198/779 |
| 6,681,922 B2 * | 1/2004 | Corley et al. | ............. | 198/853 |
| 6,874,617 B1 * | 4/2005 | Layne | ............. | 198/779 |
| 7,137,504 B2 * | 11/2006 | Ozaki et al. | ............. | 198/779 |
| 7,252,191 B2 * | 8/2007 | Ozaki et al. | ............. | 198/779 |
| 2004/0129539 A1 | 7/2004 | Corley | | |
| 2005/0109582 A1 * | 5/2005 | Fourney | ............. | 198/779 |
| 2005/0155846 A1 * | 7/2005 | Sofranec et al. | ............. | 198/779 |
| 2005/0241920 A1 * | 11/2005 | Ozaki et al. | ............. | 198/779 |
| 2005/0269189 A1 * | 12/2005 | Rau et al. | ............. | 198/779 |
| 2006/0011453 A1 * | 1/2006 | Sedlacek | ............. | 198/779 |
| 2006/0070857 A1 * | 4/2006 | Fourney | ............. | 198/779 |

FOREIGN PATENT DOCUMENTS

JP       2003-182829      7/2003

* cited by examiner

*Primary Examiner*—Bradley T King
*Assistant Examiner*—Stephen Bowes
(74) *Attorney, Agent, or Firm*—Dann, Dorfman, Herrell and Skillman, P.C.; Henry H. Skillman (57) ABSTRACT

A conveyor chain comprising a number of chain links mutually connected in the chain longitudinal direction, each chain link having a plurality of hinge parts comprising laterally-spaced hinge parts in the form of finger members protruding in laterally-spaced relation from a front edge and a rear edge as an integrally molded unit; and a ball unit holding a ball which is free to be rotated while being exposed to both sides of the chain link, the ball unit being detachably installed in a U-shaped mounting region open at one end between the hinge parts and closed at the other end. The finger members of each link are interdigitated with the finger members of the adjacent links, and are retained by a hinge pin. Removal of the ball unit is facilitated by a tool-inserting slot at the other end of the U-shaped region.

6 Claims, 8 Drawing Sheets

CONVEYOR CHAIN

FIELD OF INVENTION

The present invention relates to a conveyor chain suitable for loading and carrying an article with a flat bottom face such as a box or a plate and, particularly, a conveyor chain provided with a ball unit holding a free ball which is rotated while being exposed on both the top and the bottom of a chain link.

BACKGROUND OF THE INVENTION

As a conventional conveyor chain for loading and carrying articles, a conveyor belt adapted to slide and discharge the articles to a side of a carrying line in the course of carrying for handling, sorting or the like is known as described in Japanese Patent Laid-Open Publication No. 2003-182829.

In such a conveyor belt, each belt module for loading and carrying the articles is constituted by mutually connecting hinge parts formed on a first member and a second member superposed in a normal direction and are connected together, respectively, through a hinge pin The modules include balls for sliding and discharging the articles to the side of the carrying line, which are rotatably held between the first member and the second member.

However, the conveyor belt that is the conventional conveyor chain as described above has the problem that not only the number of part items constituting the belt module of a belt essential part is doubled, but also the integrated strength of the belt modules cannot be sufficiently exhibited since it adopts the belt module structure of confining the balls by the first member and the second member combined together from the normal direction.

It further has a troublesome problem that, replacing a worn ball is complicated. For example, the belt module composed of the first member and the second member must be in a normal direction disassembled after pulling out the hinge pin to take out the worn ball, and at that time, freeing of balls other than the worn ball may occur.

The present invention thus has been made to solve the above-mentioned problems in the conventional art, and provides a conveyor chain capable of independently and easily attaching ball units to a single chain link to prevent separation thereof, and also facilitating the detachment thereof.

SUMMARY OF THE INVENTION

A conveyor chain of the invention comprises a number of chain links mutually connected through a hinge pin in the chain longitudinal direction, each chain link having, as an integrally molded unit, an article loading part for loading articles and a plurality of hinge parts protruded alternately from the front edge and rear edge of the article loading part; and a ball unit holding a ball which is freely rotated while being exposed on the top and bottom of the chain link, the ball unit being detachably installed to a unit installation area transversely defined between adjacent hinge parts of the chain link and longitudinally by the hinge pin from the chain, in which the ball unit includes an engagement part to be engaged with the chain link to position and fix the ball unit in the normal direction (i.e. in the vertical direction when the chain is oriented with its longitudinal and transverse directions are horizontal) and in the chain longitudinal direction, and the chain link includes an engaged part slidably receiving the engagement part of the ball unit.

In the conveyor chain according to another feature of the invention, the engagement part and the engaged part include mutually slidable recess and projection engagement structures.

In the conveyor chain according to another feature of the invention, the engagement part of the ball unit is formed to be symmetrical on both sides of the ball unit.

In the conveyor chain according to another feature of the invention, the unit installation area is U-shaped.

The conveyor chain according to another feature of the invention has a tool inserting slot opening to the unit installation area.

The conveyor chain of the invention can carry an article with a flat bottom face such as a box or a plate, since a number of chain links each having, as an integrally molded unit, the article loading part for loading the article and the plurality of hinge parts protruding alternately from the front edge and rear edge of the article loading part, are mutually connected in the chain longitudinal direction through the hinge pin. Further, it can exhibit a so-called double-speed function capable of carrying the article at up to 2 times the chain speed and a carrying-direction changing function capable of carrying the article within a full horizontal plane of 360°, since the ball unit holding the free ball which is rotated while being exposed on the top and bottom of the chain link is installed into the unit installation area defined by adjacent hinge parts of the chain link and the hinge pin.

Since the ball unit is detachably installed into the unit installation area defined by adjacent hinge parts of the chain link and the hinge pin, the ball unit can be easily installed to between the adjacent hinge parts from the chain longitudinal direction as in a single part state without completely disassembling the chain.

Since the ball unit includes the engagement part to be engaged with the chain link to position and fix the ball unit in the chain double-side direction and in the chain longitudinal direction, and the chain link includes the engaged part slidably receiving the engagement part of the ball unit, the chain assembling work can be easily attained without being involved by careless dropping-out of installed ball units at the time of connecting the chain link. Further, in case of replacing a worn ball unit, for example, the replacement work can be easily attained while preventing careless separation of units other than the worn unit.

In the conveyor chain of the invention, when the engagement part of the ball unit and the engaged part of the chain link have the mutually slidable recess and protrusion engagement structures, the ball unit can be easily installed from the chain longitudinal direction, and surely positioned and fixed in the chain double-side direction and in the chain longitudinal direction.

In the conveyor chain of the invention, when the engagement part of the ball unit is formed so as to be symmetrical on the top and bottom of the ball unit, the ball unit can be installed to the chain link in a normal direction at random, and the installation work can be attained at high efficiency.

In the conveyor chain of the invention, when the unit installation area is formed in U-shape, an angle part which causes stress concentration is not present between the hinge parts, and the strength of the link itself is thus never deteriorated.

In the conveyor chain of the invention, when the chain link includes the tool inserting slot opened to the unit installation area, fixation of the installed ball unit can be easily released only by inserting a tool such as a flat-blade screwdriver to the tool inserting slot followed by rotating in the chain longitudinal direction. Accordingly, the detachment work can be easily performed.

BRIEF DESCRIPTION OF THE DRAWINGS

FIGS. 6 (*a*) to (*c*) are illustrative views showing the installation state of the ball unit, which is seen from the top side of the chain link;

FIGS. 7 (*a*) to (*c*) are illustrative views showing the installation state of the ball unit, which is seen from the bottom side of the chain link.

DESCRIPTION OF PREFERRED EMBODIMENTS

The conveyor chain of the present invention, which comprises a number of chain links mutually connected in the chain longitudinal direction by hinge pins, each chain link having, as an integrally molded unit, an article loading part for loading an article and a plurality of hinge parts protruding alternately from the front edge and rear edge of the article loading part, and a ball unit holding a ball which is freely rotated while being exposed at the top and bottom of the chain link, the ball unit being detachably installed into a unit installation area defined by adjacent hinge parts of the chain link and the hinge pin, is adapted so that ball units can be independently and easily attached to a single chain link to prevent the separation thereof, and also easily detached by providing the ball unit with an engagement part to be engaged with the chain link to position and fix the ball unit in the chain normal direction and in the chain longitudinal direction, and providing the chain link with an engaged part slidably receiving the engagement part of the ball unit. The present invention can have any specific embodiment which can realize the above effect.

Namely, the chain link used in the conveyor chain of the present invention may have any link width according to the line width of the carrying line, and the number of unit installation areas to be formed among the hinge parts of the chain link for installing ball units can be set to any number if the installed ball units can exhibit the double-speed function capable of carrying articles at up to two times the chain speed and the carrying-direction changing function capable of carrying the articles in a full horizontal plane of 360°. The unit installation area can have any shape which enables the insertion of the ball unit to the unit installation area from the chain longitudinal direction. The unit installation area is preferably U-shaped.

The dimension of a loadable part formed in the article loading part, the dimension of protruding portions of the hinge part, and the like can be properly determined according to the chain pitch of the chain link.

As a specific installation form for detachably installing the ball unit into the unit installation area defined by adjacent hinge parts and the hinge pin from the chain longitudinal direction, any form can be adapted if the ball unit includes the engagement part to be engaged with the chain link to position and fix the unit in the chain normal direction and in the chain longitudinal direction, and the chain link includes the engaged part slidably receiving the engagement part of the ball unit. Preferably, mutually slidable recess and projection engagement structures can be constituted by forming recessed engagement portions as stepped parts on upper and lower portions of the ball unit and protruding parts such as projection parts protruding from upper and lower portions of the unit installation area in the chain link so as to slidably receive the engagement portions of the ball unit between the projection parts, and engaging the stepped parts with the projection parts. Since the recess and projection structures are relative, the engagement part of the ball unit can be made to a protruding part such as a projection part, and the engaged part of the chain link to a recessed part as a stepped part.

For the specific form of the ball unit, the ball unit can have any unit form, which includes the above-mentioned engagement part and can exhibit the double-speed function capable of carrying articles at up to two times the chain speed and the carrying-direction changing function capable of carrying the articles within a full horizontal plane of 360° by holding the freely rotating ball exposed to both the sides of the chain link. The ball unit is preferably constituted so as to allow the ball to freely rotate while being exposed to both the top and bottom of the chain link in a state where it is held between a pair of upper and lower retainers which are symmetrical in a normal direction. Since the engagement part is also symmetrically arranged in a normal direction, in such a symmetric structure the ball unit can be installed to the unit installation area at random.

A conveyor chain that is one example of the present invention will be described, based on FIGS. 1 to 8.

Figure 1:
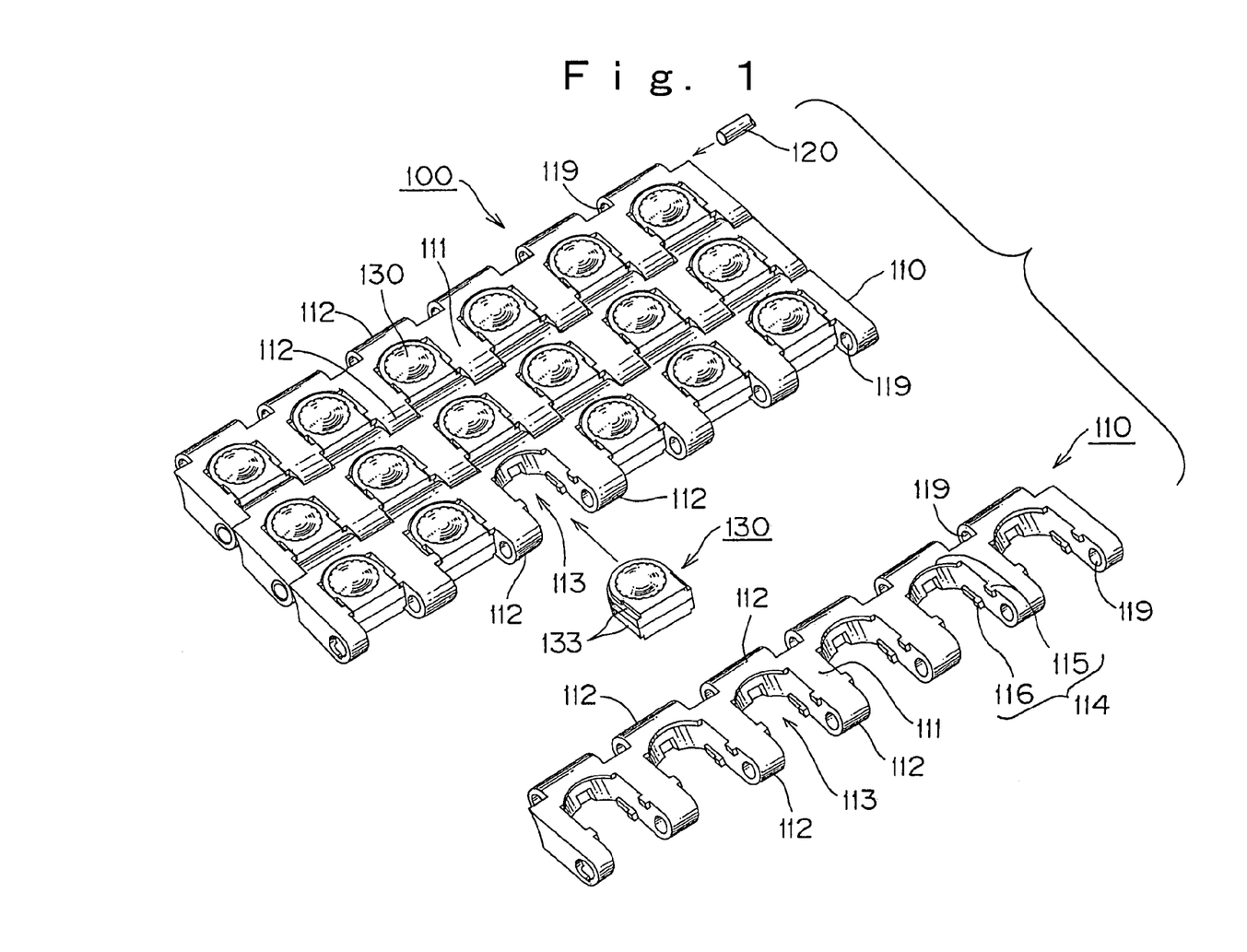
FIG. 1 is a partially exploded illustrative view of part of a conveyor chain that is one example of the present invention, seen from the top surface side.
Figure 3:
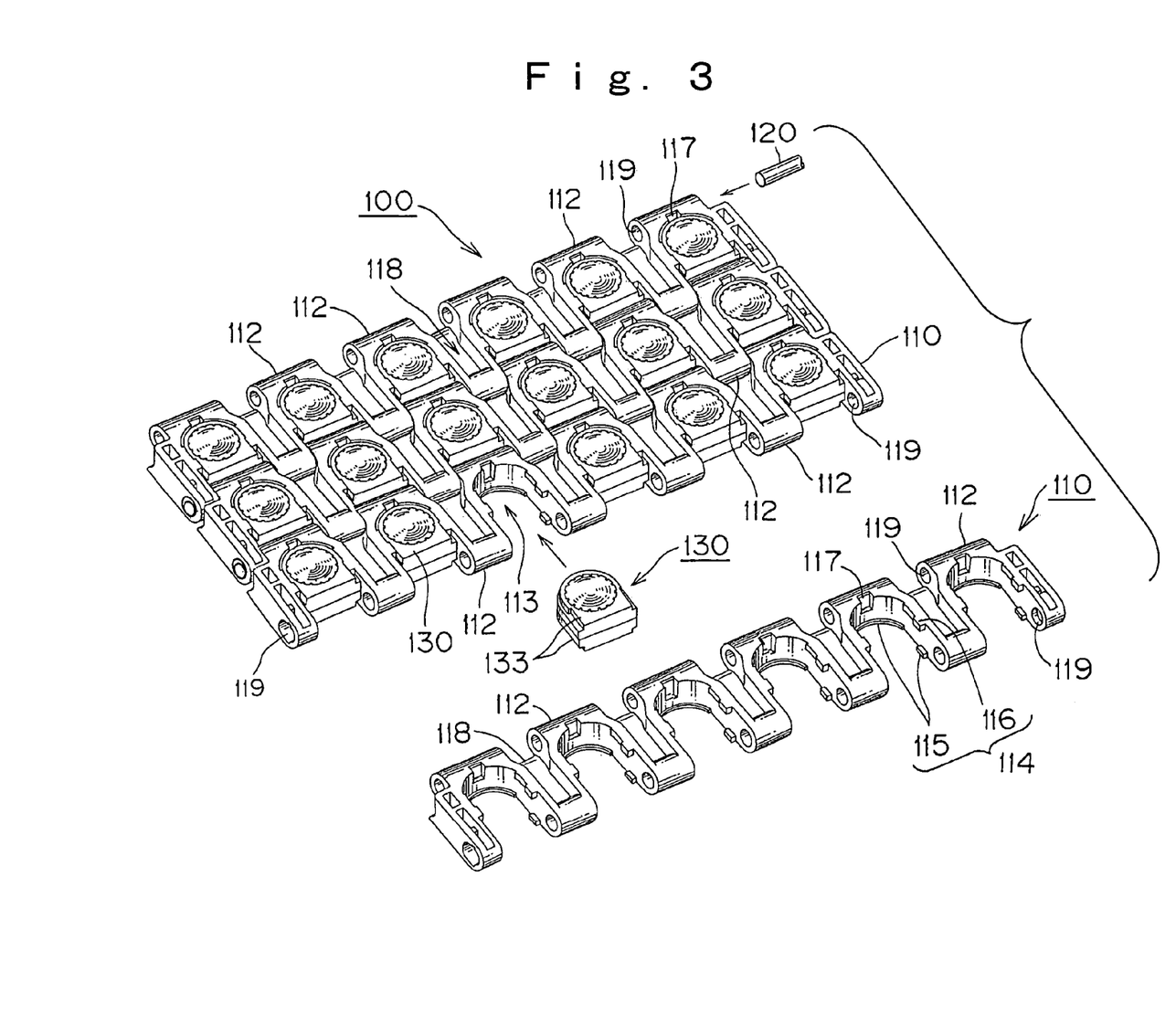
FIG. 3 is a perspective view of the conveyor chain shown in FIG. 1, as seen from the bottom side thereof; as seen from the bottom side.

In the conveyor chain 100 of this example, as shown in FIGS. 1 and 3, a number of chain links 110 are mutually connected in the chain longitudinal direction through hinge pins 120 inserted transversely through pin holes 119. A ball unit 130 is detachably installed into a unit installation area 113 defined between adjacent hinge parts 112, 112 of the chain link 110 and the hinge pin 120 from the chain longitudinal direction or from a pitch direction, and engagement parts 133 of the ball unit 130 are engaged with engaged parts 114 of the chain link 110 to position and fix the ball unit 130 in the chain normal direction and in the chain longitudinal direction so as to load and carry an article with a flat bottom face such as a box or a plate. The hinge parts 112 comprise semi-cylindrical finger members which protrude in laterally-spaced relation from the front and rear end edges, and the finger members of each link interdigitate with the corresponding finger members of the adjoining link to the front and rear.

Although the chain width direction is composed of one chain link in this example, it may be constituted by organizing chain links of the same link width in a plurality of rows in the chain width direction, or by allowing chain links differed in link width to abut on each other in the chain width direction, and connecting them in the chain longitudinal direction as brick laying without neatly arranging the butt faces thereof in the chain longitudinal direction.

Figure 2:
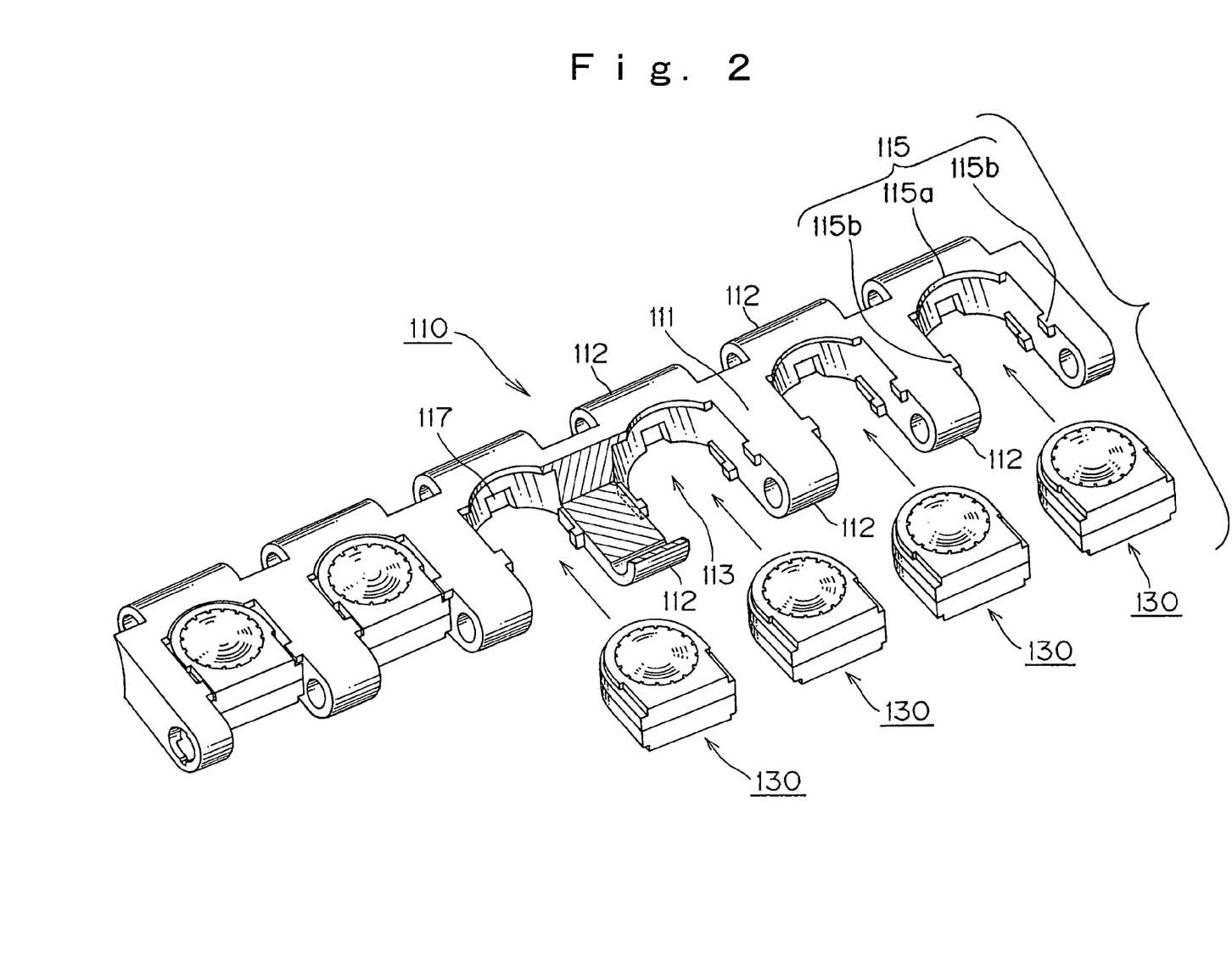
FIG. 2 is a perspective view with a portion broken away, of a chain link shown in FIG. 1, seen from the main top surface side thereof.
Figure 4:
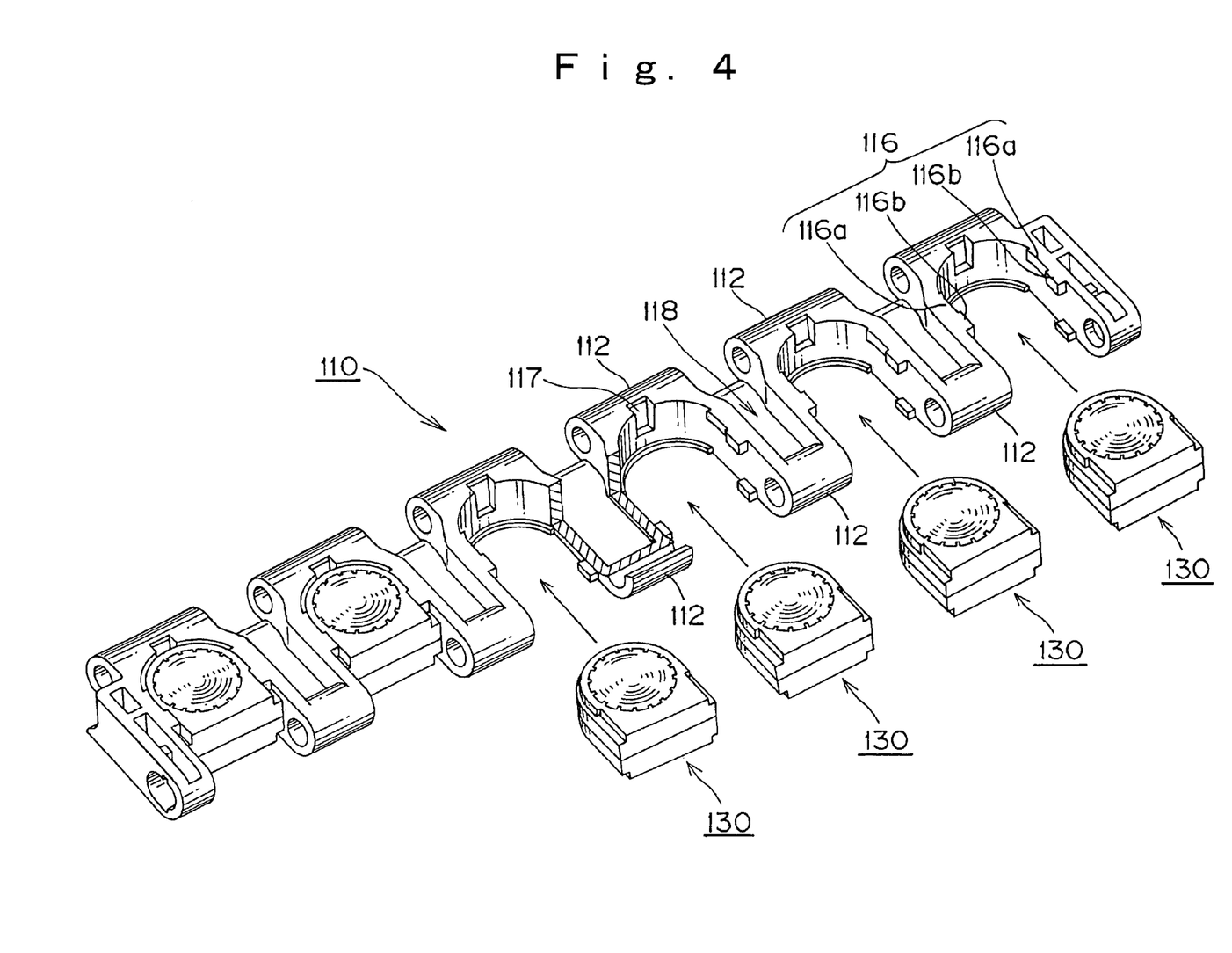
FIG. 4 is an enlarged exploded perspective view similar to FIG. 3, illustrating the assembly and detachment of ball units to and from a link.

The chain link 110 includes, as shown in FIGS. 2 and 4, an article loading part 111 for loading articles, a plurality of hinge parts 112 protruded alternately from the front edge and rear edge of the article loading part 111, the U-shaped unit installation area 113 formed between adjacent hinge parts 112, 112, an engaged part 114 (115, 116) slidably receiving the ball unit 130 which is installed from the chain longitudinal direction, a tool inserting slot 117 opened to the closed end part of the U-shaped unit installation area 113, and a meshing part 118 to be generally meshed with a driving-side sprocket or the like (not shown) to transmit a carrying power, which are molded of a synthetic resin called engineering plastics in an integrated manner.

The engaged part 114 is composed of an upper projection part 115 and a lower projection part 116. The upper projection 115 is composed of a U-shaped projection 115a (FIG. 2) protruded at the closed end part of the U-shaped unit installation area 113 and side projections 115b, 115b protruded at both sides thereof, and the lower projection part 116 (FIG. 4) is composed of L-shaped projections 116a, 116a protruded at both sides of the U-shaped unit installation area 113 and provided with extension parts 116b. These projections 115a, 115b, and 116a and the extension parts 116b are alternately provided so as to facilitate the manufacture of a die for molding the chain link.

Figure 5:
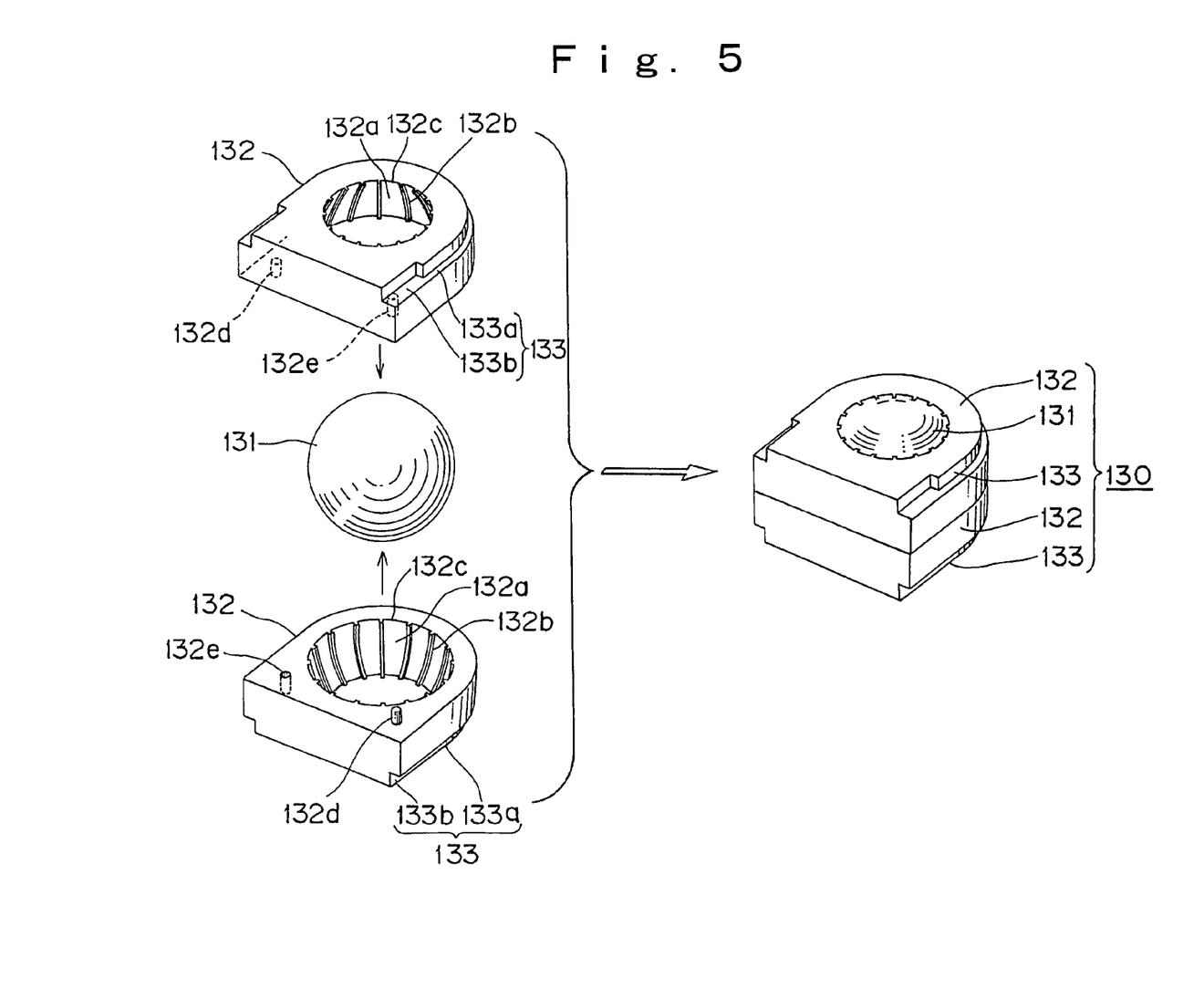
FIG. 5 has an exploded view of the ball unit; and a perspective view of the assembled unit.

The ball unit 130, which has the article carrying-direction changing function and the double-speed function, is composed of the free ball 131 and a pair of upper and lower retainers 132, 132 holding the free ball 131, as shown in FIG. 5.

The pair of upper and lower retainers 132, 132, which are symmetrical in a normal direction, each include a hemispherical ball receiving seat 132a and an opening part 132c for rotating the free ball 131 while exposing the free ball to both the sides of the chain link 110. The ball receiving seat 131 has a plurality of ribs 132b radially arranged thereon, so that the contact area of the free ball 131 with the ball receiving seat 132a can be minimized to smooth the rotation, and wear debris or the like can be discharged.

Denoted at 132d in FIG. 5 is a positioning projection for combining the U-shaped retainers 132, 132 to be paired in a normal direction, and 132e is a blind hole to which the positioning projection 132d opposed thereto is inserted at the time of combining the normal pair of retainers 132, 132 together.

Each of the U-shaped retainers 132, 132 to be paired in a normal direction further includes the engagement part 133 which is slidably received and engaged between the upper projection part 115 and the lower projection part 116 provided on the chain link 110 when the ball unit 130 is fitted to the unit installation area 113 from the chain longitudinal direction, and the engagement part 133 is composed of a U-shaped stepped part 133a and cutout stepped parts 133b, 133b connected to both ends of the stepped part 133a.

Figures 6A, 6B, 6C:
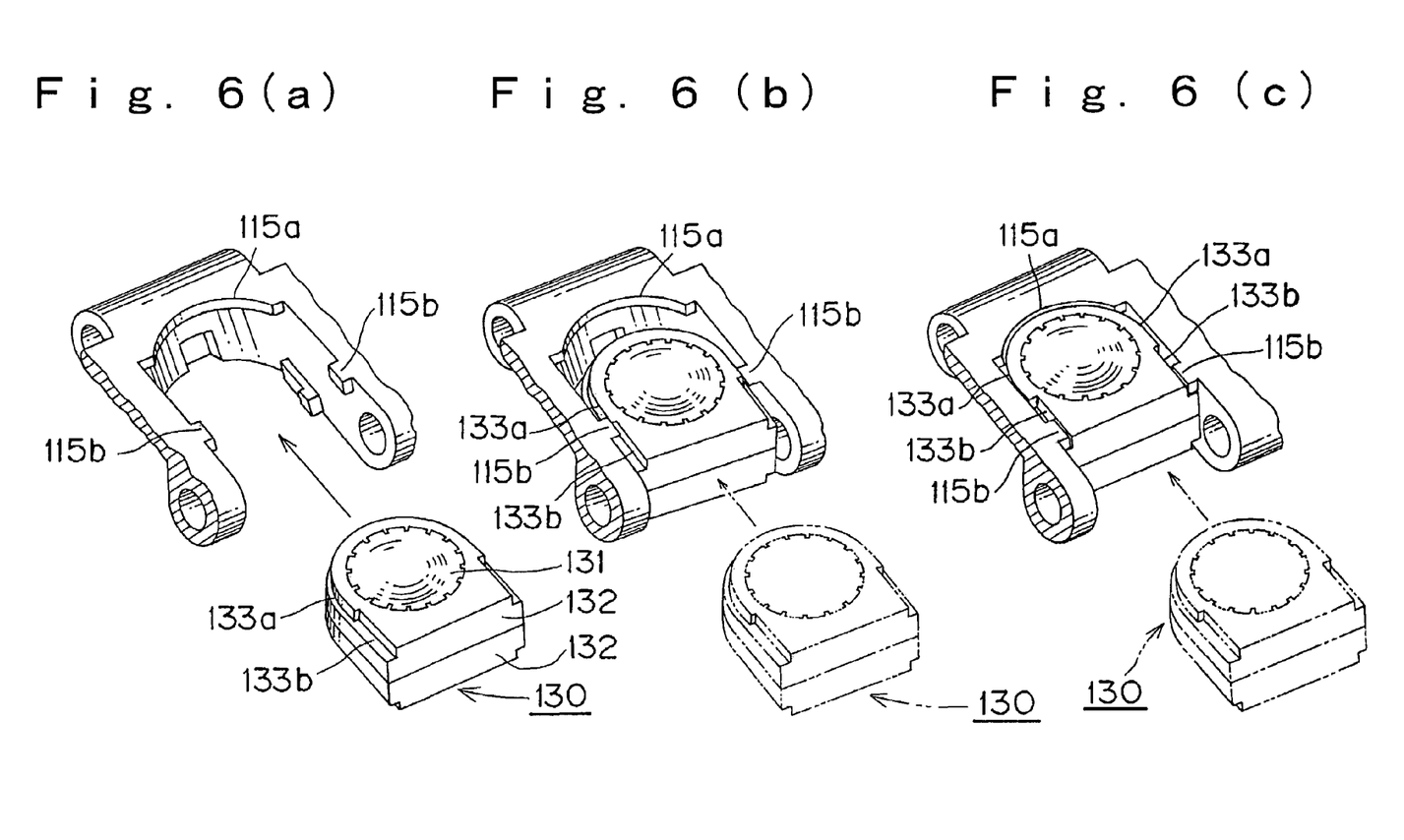
Figure 7:
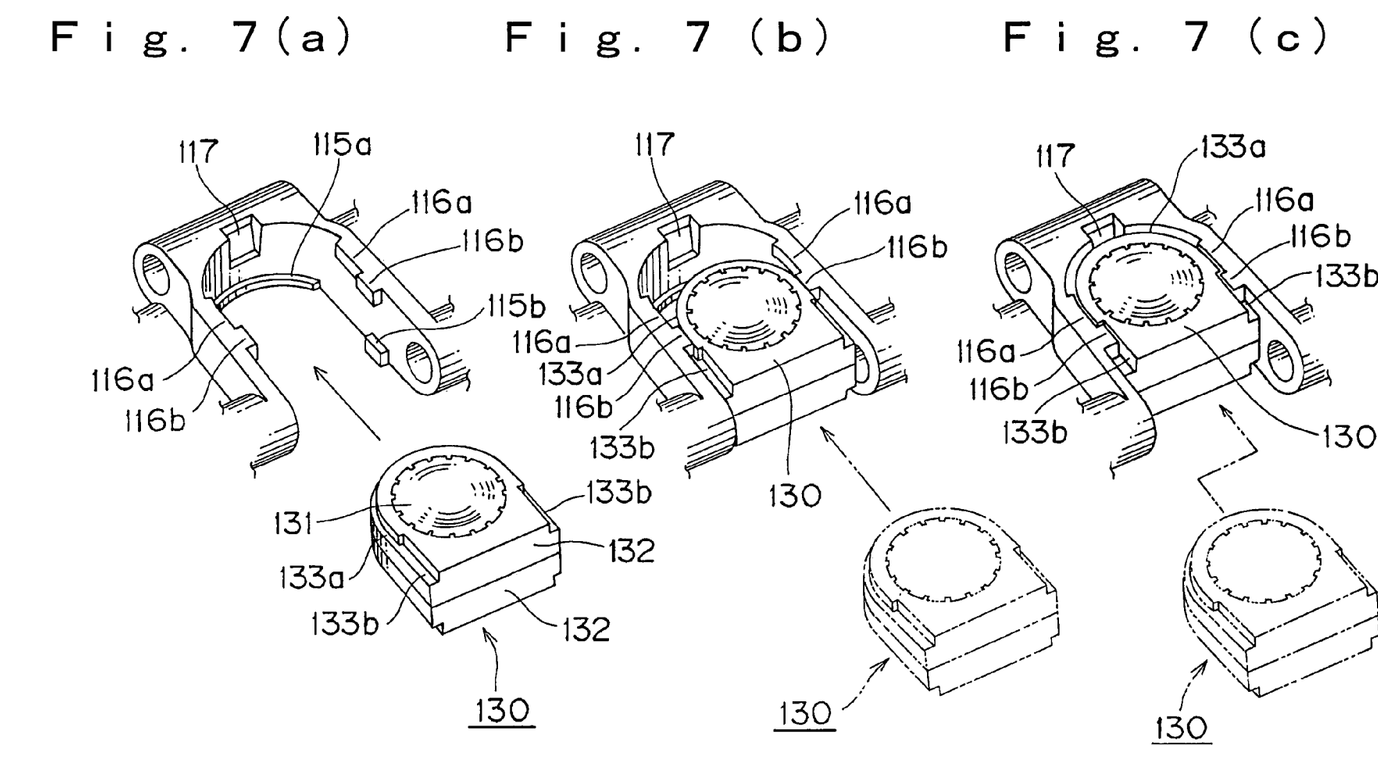

The thus-constituted ball unit 130 is engaged with the chain link 110, as shown in FIGS. 6 and 7, and positioned and fixed in the chain double-side direction and in the chain longitudinal direction.

Namely, when the ball unit 130 is inserted between the hinges 112, 112 from the chain longitudinal direction as shown in FIG. 6(a) and FIG. 7(a), the upper surface of the upper U-shaped stepped part 133a of the ball unit 130 abuts on the lower surface of the side projections 115b, 115b of the chain link 110 as shown in FIG. 6(b), the lower surface (the upper surface in the drawing) of the lower U-shaped stepped part 133a of the ball unit 130 abuts on the upper surface (the lower surface in the drawing) of the L-shaped projection 116a of the chain link 110, and the side surface of the U-shaped stepped part 133a abuts on the side surface of the extension part 116b of the L-shaped projection 116a to elastically widen an area between the hinge parts 112, 112, and the ball unit is slid between the side projection 115b and the L-shaped projection 116a, and inserted to the unit installation area 113.

When the ball unit 130 is installed to the unit installation area 113 in a state shown in FIGS. 6(a) and 7(c), the widened area between the hinge parts 112, 112 is restored to the original state, the upper surface of the upper U-shaped stepped part 133a of the ball unit 130 abuts on and engages with the lower surface of the U-shaped projection 115a of the chain link 110, and the upper surface of the cutout stepped part 133b also abuts on and engages with the lower surface of the side projection 115b to regulate the movement of the ball unit in the chain main surface direction.

As shown in FIG. 7(c), also, the extension part 116b of the L-shaped projection 116a is engaged with the cutout stepped part 133b according to the restoration of the area between the hinge parts 112, 112 to regulate the movement in the chain longitudinal direction and the upper surface (the lower surface in the drawing) of the L-shaped projection 116a abuts on and engages with the lower surface (the upper surface in the drawing) of the U-shaped stepped part 133a to regulate the movement in the chain reverse direction. Namely, the ball unit 130 is engaged with the chain link 110 and positioned and fixed in the chain normal direction and in the chain longitudinal direction.

Since FIG. 7 shows the installation state of the ball unit seen from the reverse side of the chain link, the upper surface and the lower surface thereof are reversed in a normal direction in the drawings in the descriptions of FIGS. 7(b) and (c).

The chain link 110 installed with the ball unit 130 as described above is connected with an adjacent chain link 110 by inserting the hinge pin 120 to the pin holes 119 as shown in FIGS. 1 and 3.

At that time, since the ball unit 130 is engaged with the chain link 110 and positioned and fixed in the chain double-side direction and in the chain longitudinal direction, the chain assembling work can be easily attained without being involved by careless dropping-out of the installed ball units.

In case of replacing a ball unit due to wear or the like, the hinge pin 120 is pulled out of an intended chain link 110 to detach an adjacent chain link 110, whereby the area between the hinge parts 112, 112 is opened. Then, the ball unit 130 of the replacement object is pulled out in the chain longitudinal direction, and can be replaced by a new ball unit 130. Since the ball unit 130 is engaged with the chain link 110 and positioned and fixed in the chain normal direction and in the chain longitudinal direction at that time, the replacement work can be easily attained while preventing careless separation of other installed ball units 130.

In this replacement work, a tool (not shown) such as a flat-blade screwdriver is inserted to the tool inserting slot 117 opened to the closed end part of the U-shaped unit installation area 113 and rotated in the chain longitudinal direction with the tool end as a fulcrum, whereby the installed ball unit 130 is pushed out in the chain longitudinal direction as shown in FIGS. 6(c) and 7(c), and easily returned to a state where the engaging locking of the extension part 116b of the L-shaped projection with the cutout stepped part 133b is released, or in a state where the fixation is released. Therefore, the ball unit 130 can be taken between the fingers and pulled out.

As described above, since the upper portion of the free ball 131 protrudes from the surface of the loading part 111 in the conveyor chain 100 of this example, an article with a flat lower surface such as a box or a plate placed on the conveyor chain 110 can be slid by free rotation of the free ball 131, whereby the carrying-direction changing function capable of carrying the article within a full horizontal plane of 360° can be exhibited.

Figure 8:
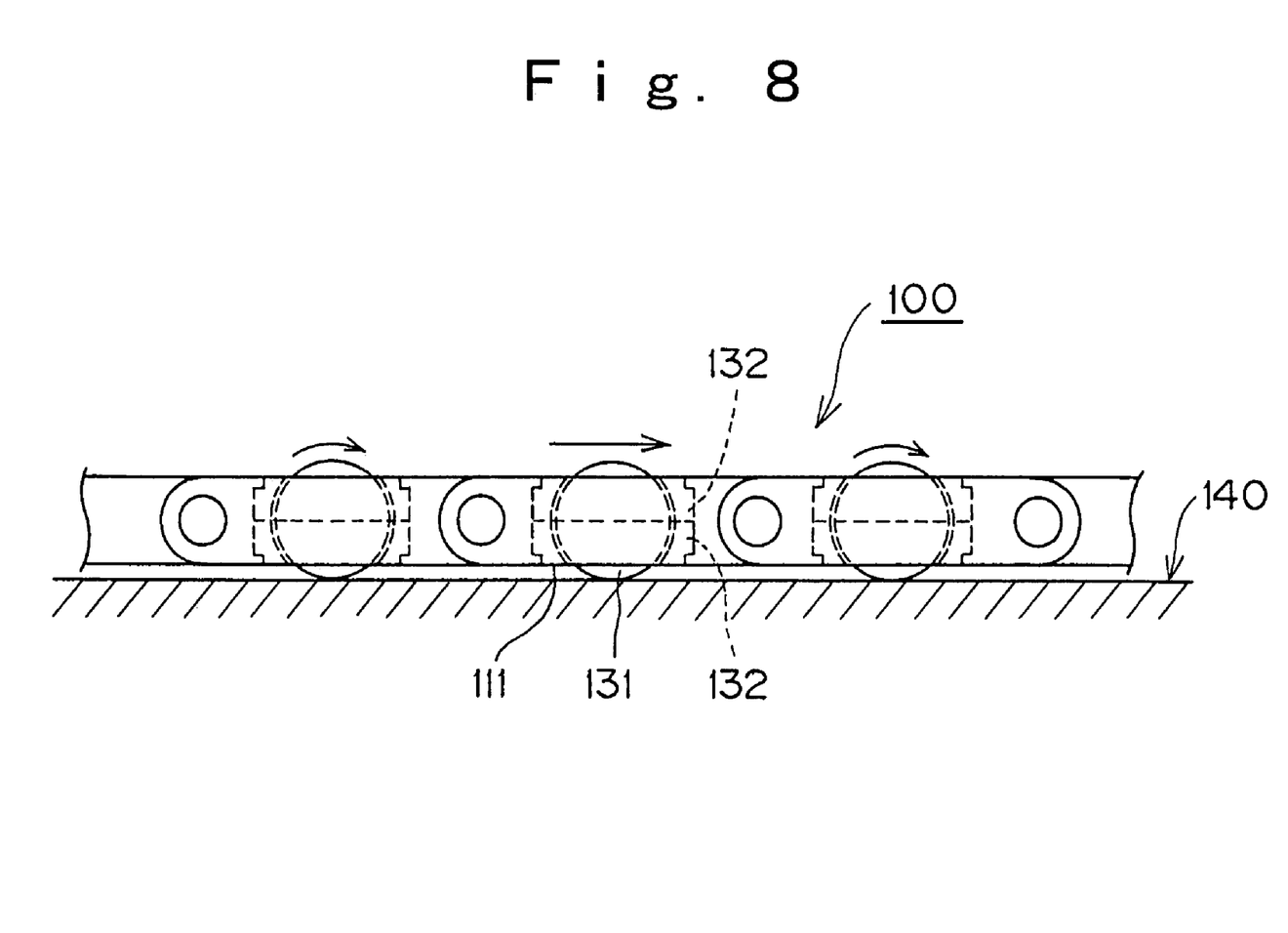
FIG. 8 is an illustrative view showing the operation of the conveyor chain.

A guide plate 140 is properly set on the lower surface of the conveyor chain 100, as shown in FIG. 8, so as to make contact with the lower portion of the free ball 131 protruding from the lower end of the loading part 111, whereby the ball 131 is freely rotated in the advancing direction according to the traveling of the conveyor chain 100. Therefore, the double-speed function of carrying the article on the top of the conveyor at up to two times the chain speed can be exhibited in the setting part of the guide plate 140.

The chain link 110, the hinge pin 120, and the ball unit 130 in this example are light-weight and convenient since they are molded of engineering plastics. However, these may be molded of general plastics or metals.

The thus-obtained conveyor chain 100 of this example has enormous effects such that the chain assembling work can be easily attained without being involved by careless dropping-out of installed ball units 130 at the time of connecting the chain link 110, and even in case of replacing the worn ball unit 130, for example, the replacement work can be easily attained while preventing careless separation of ball units other than the worn ball unit 130, since the ball unit 310 holding the free ball 131 which is rotated while being exposed to both sides of the chain link 110 by a pair of upper and lower retainers 132, 132 is detachably installed into the unit installation area 113 defined by adjacent hinge parts 112, 112 of the chain link 110 and the hinge pin 120 from the chain longitudinal direction, the ball unit 130 includes the engagement part 133 to be engaged with the chain link 110 to position and fix the ball unit in the chain double-side direction and in the chain longitudinal direction, and the chain link 110 includes the engaged part 114 slidably receiving the engagement part 133 of the ball unit 130.

In the illustrated embodiment, the sprocket-receiving parts 118 are formed on the bottom side of the links, to permit driving the conveyor from below, but the parts 118 may be disposed on the upper side of the links to enable the conveyor to be driven from above.

The invention claimed is:

1. A conveyor chain comprising a number of chain links connected by hinge pins, each link including
   a plurality of hinge parts comprising finger members protruding in laterally-spaced relation from front end edges and rear end edges, adjacent ones of said links being connected to each other in the longitudinal direction of the chain through said hinge pin, and
   free ball elements which are free to rotate in any direction protruding from both the top surface and bottom surface of said chain, wherein
   each of said chain links has a body with U-shaped mounting regions forming ball-receiving channels having a base wall in the middle of the link and side walls extending longitudinally of the chain from the middle of the link through one of said front end edge and rear end edges to provide an open end for said channel in said one end edge, and a pair of ball-holding retainer elements rotatably sandwiching one of said free ball elements therebetween in one channel of one of said mounting regions of said chain links,
   said channel open end being closed by said hinge pin to capture the ball-holding retainer elements, and
   an exposed tool-inserting slot intercepting the base of each of said U-shaped mounting regions to enable the insertion of a tool to displace said ball-holding retainer along said side walls away from said base.

2. The conveyor chain according to claim 1, wherein said chain link includes a sprocket-receiving part on one of said upper and lower surfaces of the link, said part adapted to mesh with a sprocket for driving the conveyor.

3. The conveyor chain according to claim 1, wherein said slot is located in said link body.

4. The conveyor chain according to claim 1, wherein said slot is exposed to the bottom surface of said chain.

5. The conveyor chain according to claim 1, wherein said pair of ball holding elements have ball receiving arcuate surfaces including a plurality of ribs or grooves.

6. A conveyor chain comprising a number of chain links connected by hinge pins, each link including
   a plurality of hinge parts comprising finger members protruding in laterally-spaced relation from front end edges and rear end edges, adjacent ones of said links being connected to each other in the longitudinal direction of the chain through said hinge pin, and
   free ball elements which are free to rotate in any direction protruding from both the top surface and bottom surface of said chain, wherein
   each of said chain links has a body with U-shaped mounting regions forming ball-receiving channels having a base wall in the middle of the link and side walls extending longitudinally of the chain from the middle of the link through one of said front end edge and rear end edges to provide an open end for said channel in said one end edge, and a pair of ball-holding retainer elements rotatably sandwiching one of said free ball elements therebetween in one channel of one of said mounting regions of said chain links,
   said channel open end being closed by said hinge pin to capture the ball-holding retainer elements, and
   a sprocket-receiving part on one of said upper and lower surfaces of the link, said part adapted to mesh with a sprocket for driving the conveyor.

* * * * *